(12) United States Patent
Jarasson et al.

(10) Patent No.: US 8,127,394 B2
(45) Date of Patent: Mar. 6, 2012

(54) END-PIECE FOR A WINDSHIELD WIPER BLADE UNIT

(75) Inventors: Jean-Michel Jarasson, Elancourt (FR); Frédéric Boussicot, Conflans Ste Honorine (FR); Xavier Bousset, Clermont-Ferrand (FR)

(73) Assignee: Valeo Systèmes d'Essuyage, La Verrière (FR)

( * ) Notice: Subject to any disclaimer, the term of this patent is extended or adjusted under 35 U.S.C. 154(b) by 1189 days.

(21) Appl. No.: 11/547,824

(22) PCT Filed: Apr. 4, 2005

(86) PCT No.: PCT/EP2005/003508
§ 371 (c)(1), (2), (4) Date: Aug. 6, 2007

(87) PCT Pub. No.: WO2005/108178
PCT Pub. Date: Nov. 17, 2005

(65) Prior Publication Data
US 2008/0127442 A1  Jun. 5, 2008

(30) Foreign Application Priority Data
Apr. 7, 2004  (FR) ..................... 04 03626

(51) Int. Cl.
*B60S 1/02*  (2006.01)

(52) U.S. Cl. .......... 15/250.361; 15/250.452; 15/250.454

(58) Field of Classification Search ............. 15/250.361, 15/250.3, 250.32; *B60S 1/02, 1/40, 1/38*
See application file for complete search history.

(56) References Cited

U.S. PATENT DOCUMENTS

| | | | | |
|---|---|---|---|---|
| 4,457,041 A | * | 7/1984 | Kimber et al. | ........... 15/250.453 |
| 5,926,907 A | * | 7/1999 | Schmid et al. | ........... 15/250.361 |
| 6,668,419 B1 | | 12/2003 | Kotlarski | |
| 6,675,434 B1 | | 1/2004 | Wilhelm et al. | |
| 2003/0074762 A1 | | 4/2003 | De Block | |

FOREIGN PATENT DOCUMENTS
EP  0 646 507  4/1995
GB  702 899  1/1954

OTHER PUBLICATIONS

International Search Report for PCT/EP2005/003508 dated May 20, 2005 (3 pages).

* cited by examiner

*Primary Examiner* — Monica Carter
*Assistant Examiner* — Stephanie Newton
(74) *Attorney, Agent, or Firm* — Osha • Liang LLP

(57) ABSTRACT

The invention relates to an end-piece (20) for a windshield wiper blade unit, which end-piece comprises: an open hollow body (26) that receives a longitudinal end of the spine member; and locking means for locking the end of the spine member in the engaged position in which it is engaged in the cylindrical recess. In accordance with the invention, the locking means (46, 48) are declutchable, so as to enable the end-piece to be dismounted from the front end of the spine member.

8 Claims, 10 Drawing Sheets

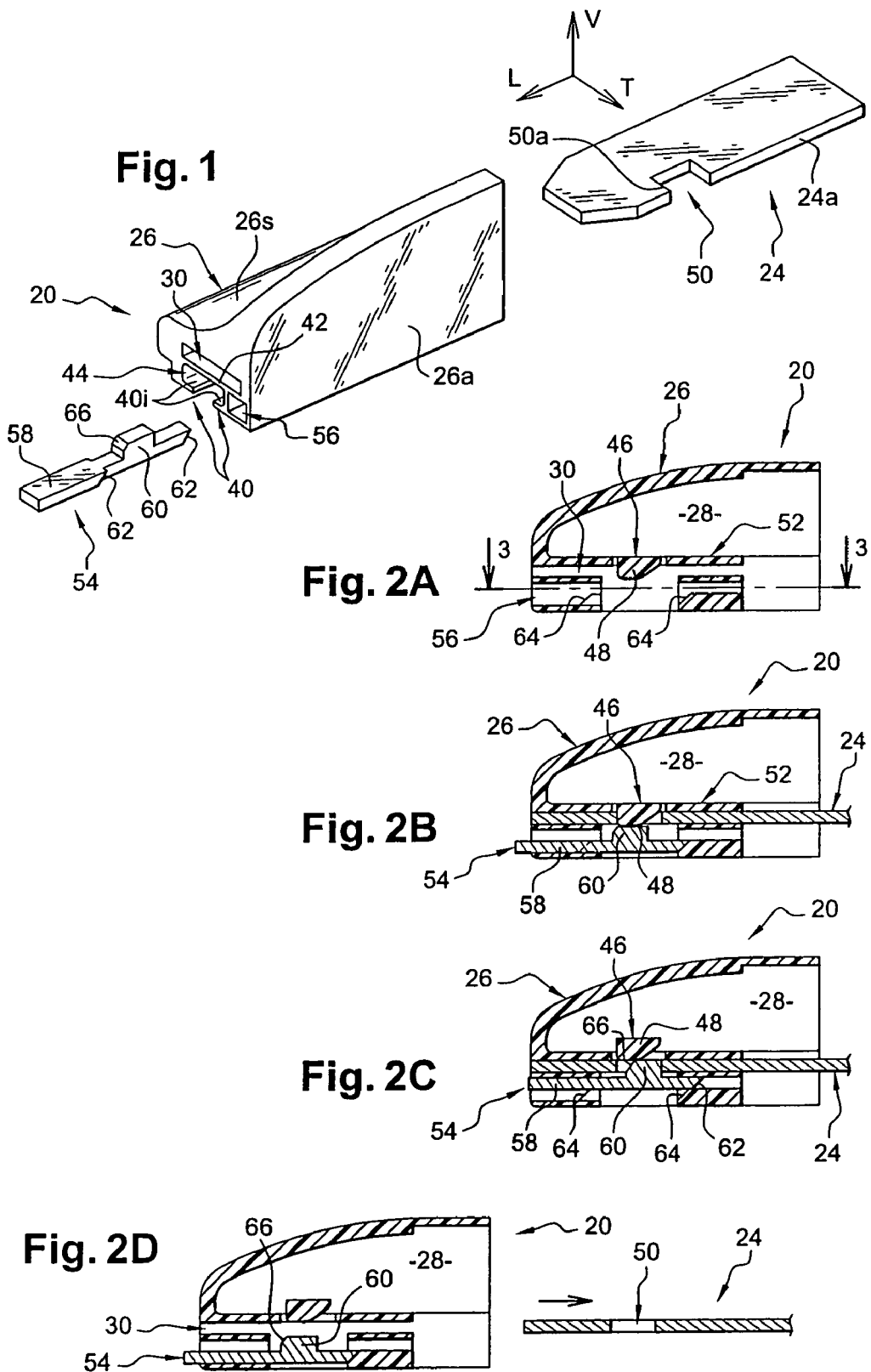

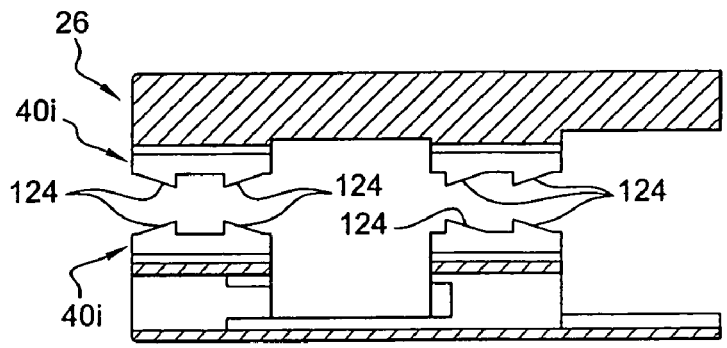
Fig. 3
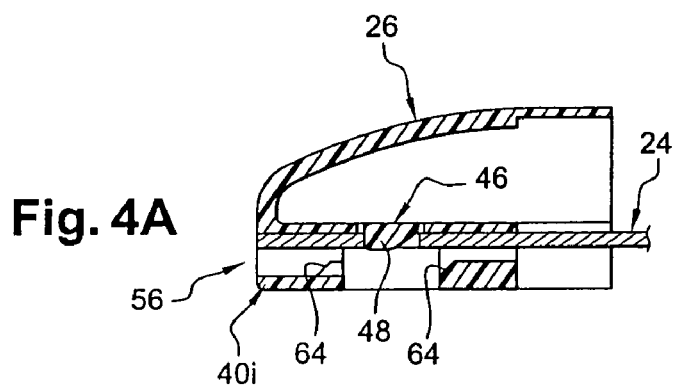
Fig. 4A
Fig. 4B
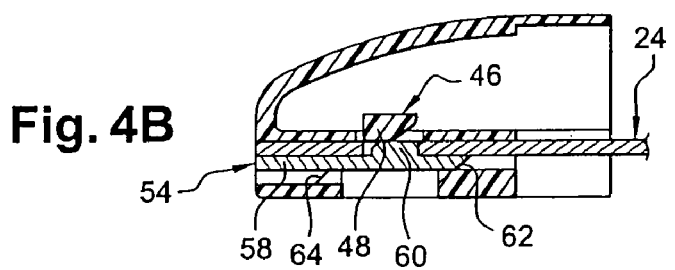
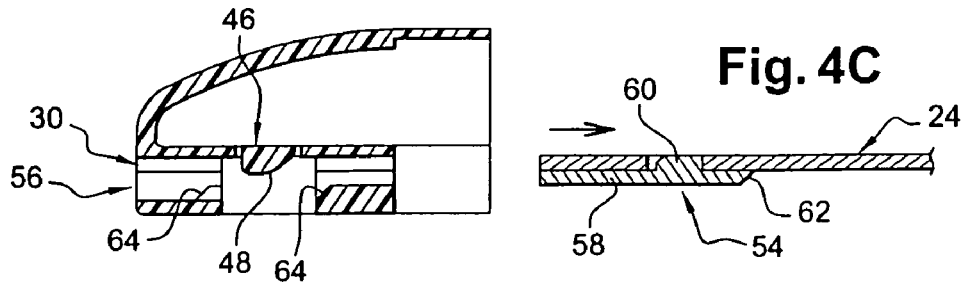
Fig. 4C

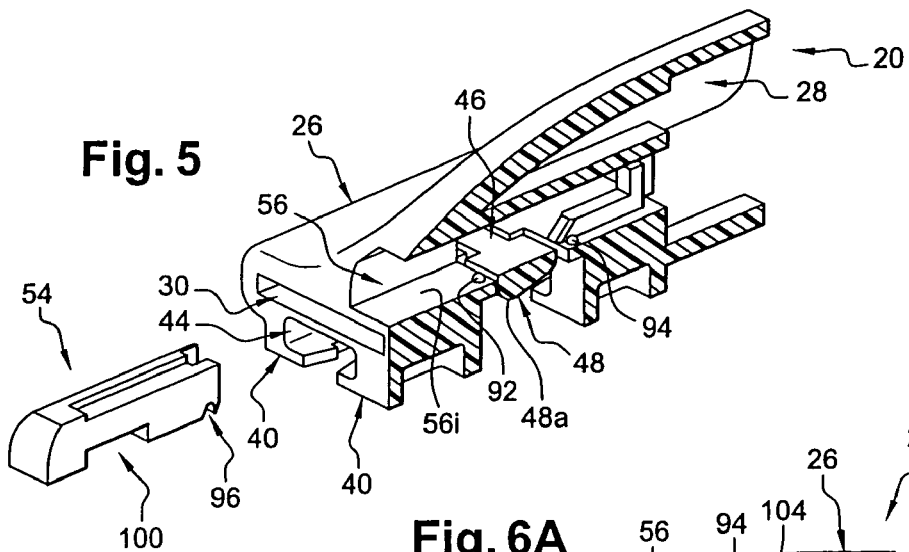
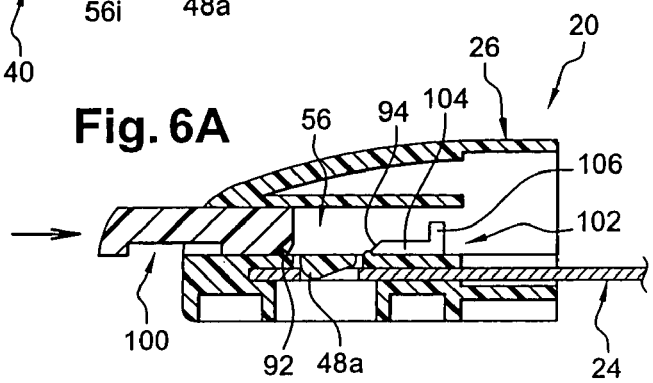
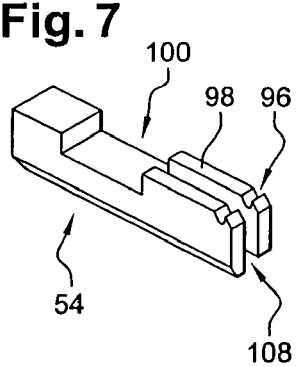
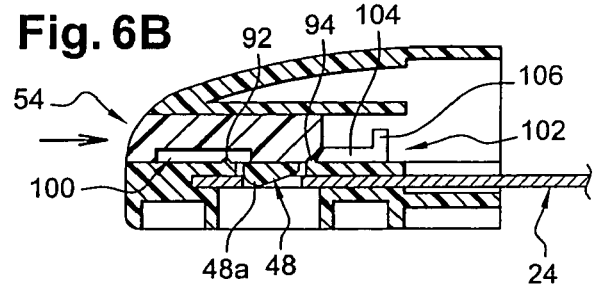
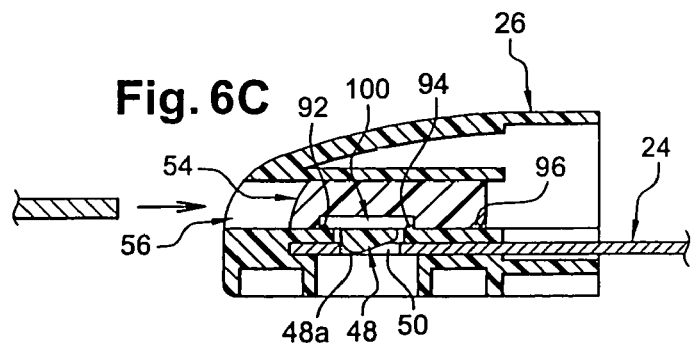

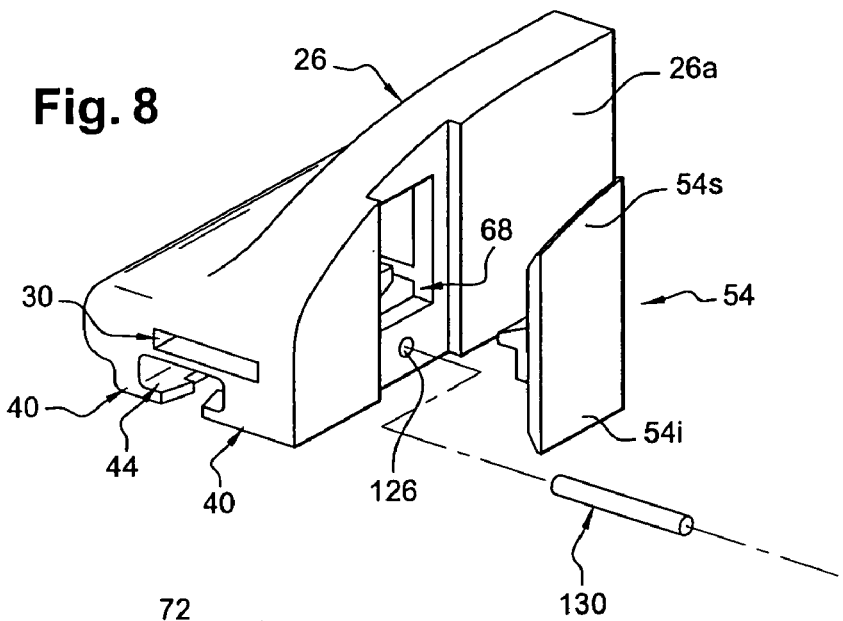
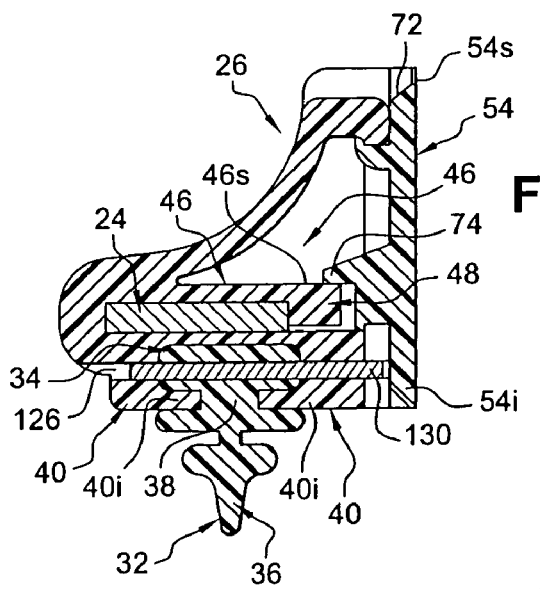
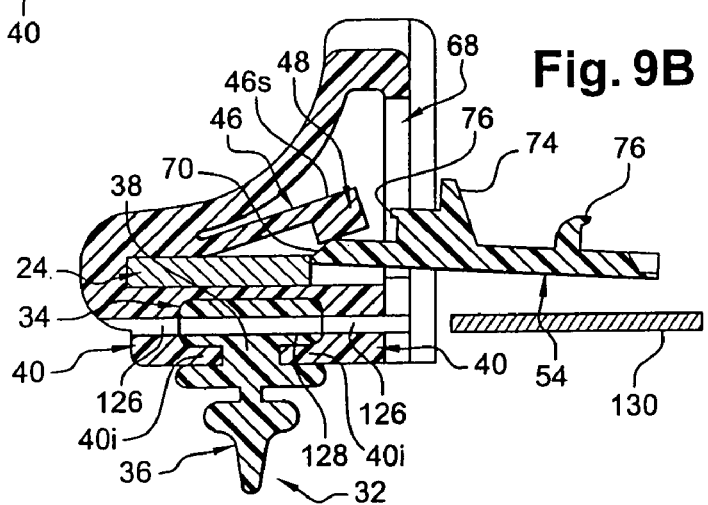

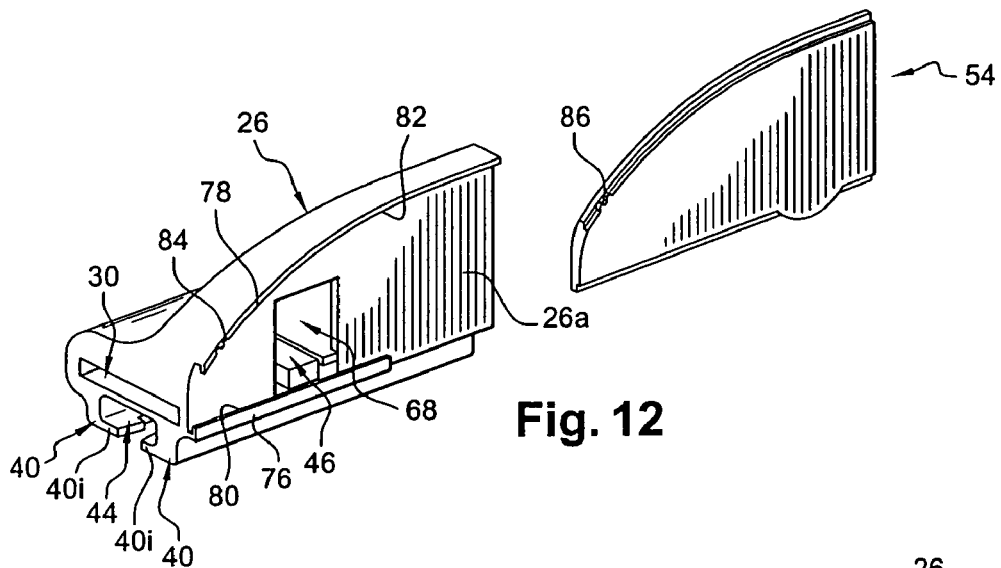
Fig. 12
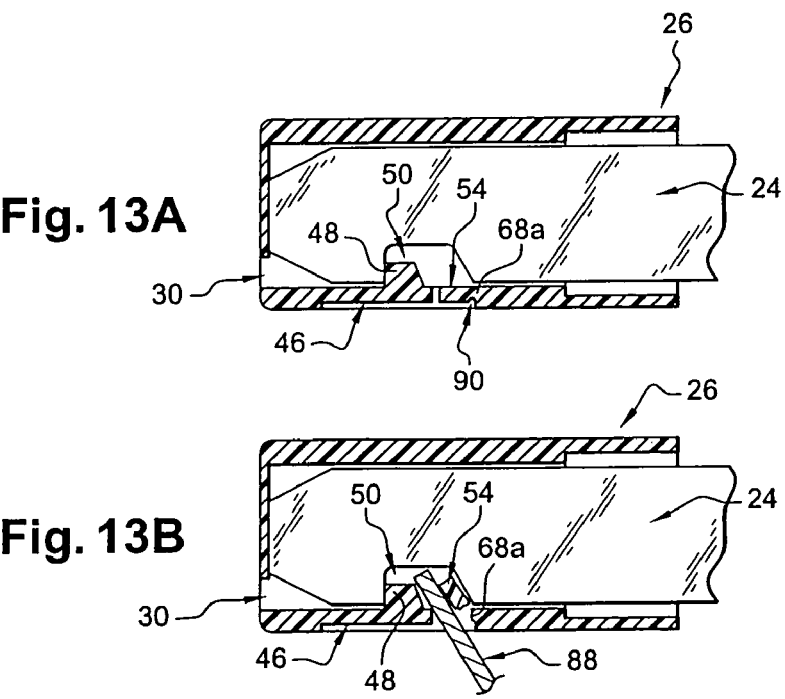
Fig. 13A
Fig. 13B
Fig. 13C

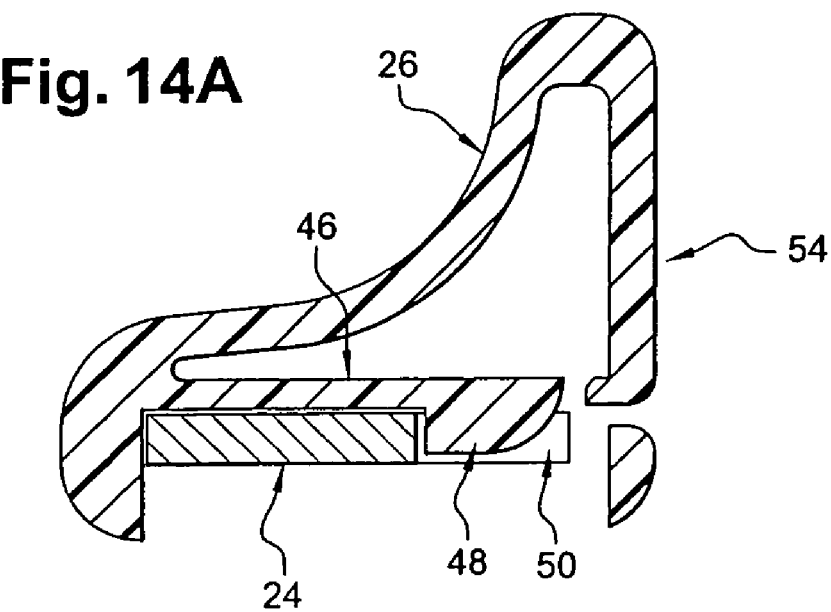
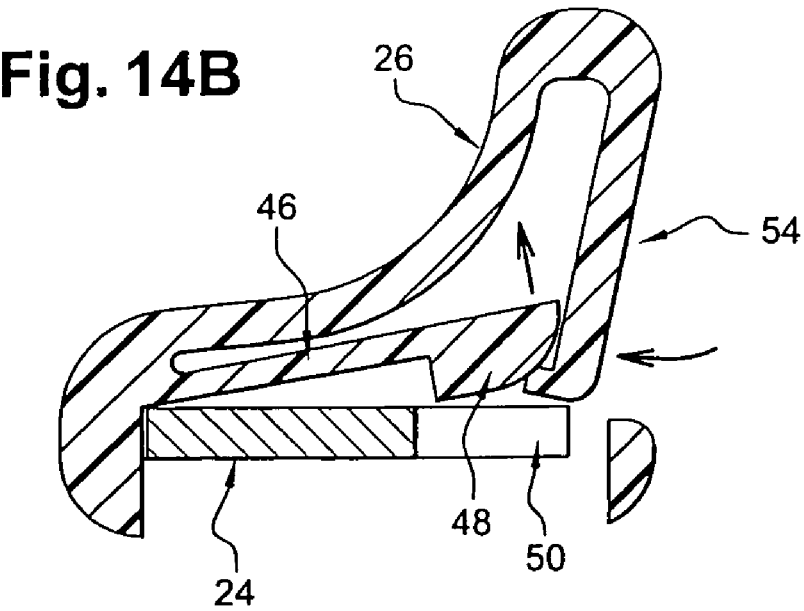

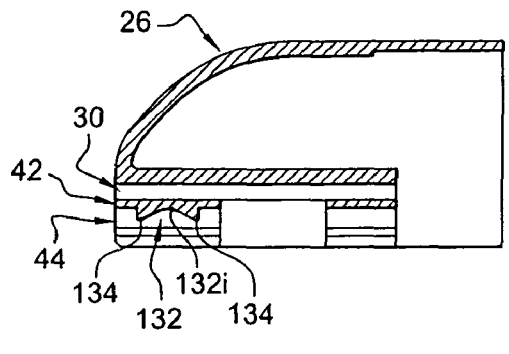
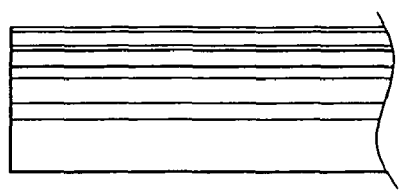
Fig. 18A
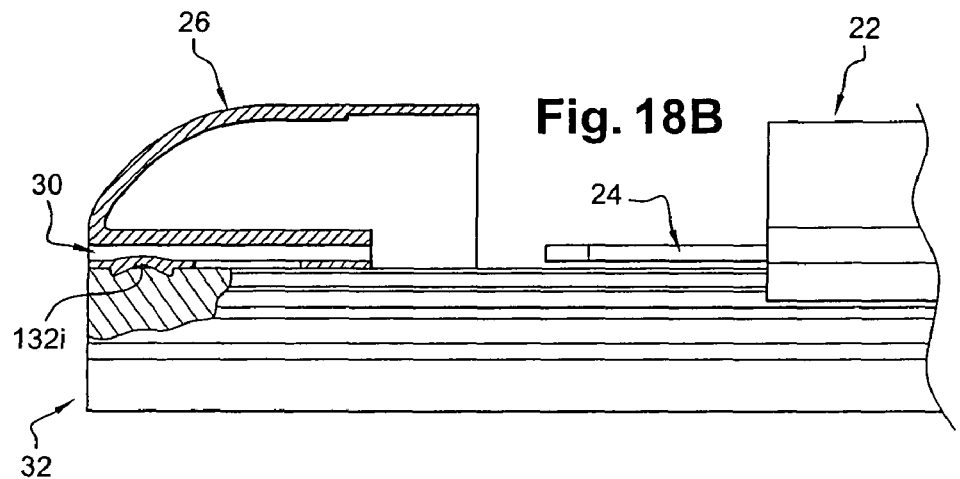
Fig. 18B
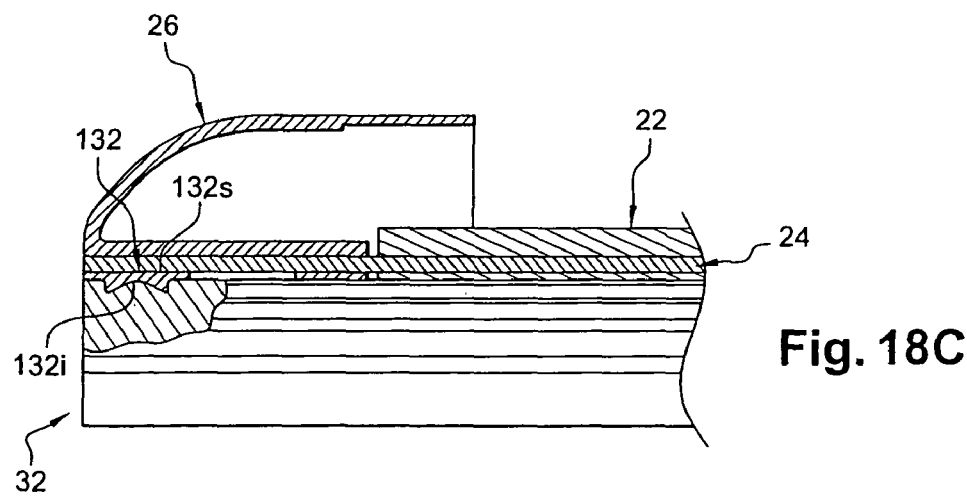
Fig. 18C

END-PIECE FOR A WINDSHIELD WIPER BLADE UNIT

The invention relates to an end-piece for a windshield wiper blade unit of the "flat-blade" type for a motor vehicle.

The invention proposes more particularly an end-piece for a windshield wiper blade unit, which end-piece comprises:
- an open hollow body that receives a longitudinal end of the spine member; and
- locking means for locking the end of the spine member in the engaged position in which it is engaged in the hollow body.

In a low-height or "low-profile" design for a windshield wiper blade unit, the hinged structure of the windshield wiper blade unit that carries the wiper blade proper, i.e. the squeegee or "rubber", is omitted, and it is the association of a hollow support frame with a longitudinal stiffener spine member that constitutes the structure proper of the wiper blade unit.

The "flat-blade" wiper unit thus comprises a central support frame, a stiffener spine member inserted in the support frame, a coupling element for coupling the wiper blade unit to a drive arm, and a wiper blade proper for wiping the glazing of the vehicle.

In order to fasten the wiper blade to the support frame, the wiper blade unit further comprises an end-piece which is mounted on one end of the support frame, and which is provided with means for fastening it to the support frame and/or to the spine member, and with means for fastening it to the wiper blade.

In order to maintain a pleasing overall appearance, the wiper blade unit further comprises a second end-piece that is mounted on the other end of the support frame.

When the wiper blade is worn, it must be replaced with a new blade.

In a manner in widespread use, the blade is replaced by changing the entire wiper blade unit. That generates a large amount of waste due to the support frame, the spine member, and the coupling element being discarded.

Current end-pieces are generally assembled to the support frame by permanent fastening, e.g. by crimping, as shown in Document U.S. Pat. No. 5,598,603.

Such assembly does not make it possible to dismount the wiper blade from the support frame, and it thus necessary to discard the entire wiper blade unit when the wiper blade is worn.

An object of the invention is to propose an end-piece that makes it possible for the wiper blade to be dismounted from the support frame when the wiper blade is worn.

To this end, the invention provides an end-piece of the above-described type, characterized in that the locking means are declutchable, so as to enable the end-piece to be dismounted from the front end of the spine member.

According to other characteristics of the invention:
- the hollow body is provided with a cylindrical recess which is of longitudinal major axis and in which the end of the spine member is engaged;
- the locking means comprise a tongue having a free end provided with a lug that is received in a complementary notch provided in the spine member, so as to lock the front end of the spine member such that it is prevented from moving longitudinally in the engaged position in which it is engaged in the cylindrical recess;
- the tongue extends horizontally and transversely inside the hollow body, above the cylindrical recess;
- the end-piece further comprises a moving element for driving the resilient tongue towards an unlocking position in which it unlocks the spine member;
- the moving element has a longitudinal body and a top abutment finger that is suitable for co-operating with the lug so as to drive the tongue upwards, towards its unlocking position;
- the hollow body is provided with a bottom recess which extends mainly longitudinally, which is forwardly open, and in which the moving element slides to drive the locking means towards the unlocking position;
- the moving element is provided with guide means suitable for co-operating with complementary means in the recess so that the moving element is suitable for sliding backwards and upwards inside the recess when it drives the locking means towards their unlocking position;
- the moving element is provided with sloping faces that are suitable for co-operating with complementary ramp-shaped portions of the recess while said moving element is moving inside said recess;
- the abutment finger is received in the notch in the spine member when the moving element is in a top back position corresponding to the unlocking position of the tongue;
- the spine member is suitable for driving the moving element as it is being disengaged from the cylindrical recess;
- the moving element is mounted to slide inside a recess in the hollow body between a locking position in which it locks the tongue in the locking position thereof and in which it prevents any movement of the tongue towards its unlocking position, and a dismounting second position in which it allows the locking tongue to move towards its unlocking position;
- the hollow recess is provided with spikes that are received selectively in a complementary groove of the moving element in order to lock the moving element in each of its positions inside the hollow recess;
- the hollow body is provided with a side opening giving access to the tongue, which opening is formed in a vertical longitudinal side wall of the body, and the moving element forms a flap that is suitable for closing off said side opening;
- the flap-forming moving element is suitable for taking up a first position in which it closes off the side opening of the hollow body, and a second position in which the moving element is driven manually to drive the tongue;
- the moving element locks the tongue in the locking position when it is in its first position;
- the moving element is provided with an internal finger which presses on the top face of the tongue when it is in its first position;
- the moving element is fastened to the hollow body by interfitting complementary shapes;
- the moving element is formed integrally with the hollow body, and it is suitable for being disunited from the hollow body by breaking one of its ends;
- the moving element covers at least a fraction of the side wall of the hollow body when it is in its first position;
- the moving element is suitable for sliding longitudinally along the side wall of the hollow body as it moves from its first position to its second position and from its second position to its first position;
- the hollow body is provided with a top rib having a top groove and with a bottom rib having a bottom groove, the ribs and their grooves guiding the moving element as it slides along the side wall of the hollow body;

the moving element consists of a tongue formed in the side wall of the hollow body and suitable for being elastically deformed so as to drive the locking tongue towards its unlocking position;

the tongue is formed in a side wall of the hollow body, and the end-piece has a moving element that is situated in alignment with the tongue, and is suitable for being disunited from the side wall, so as to uncover an opening making it possible to drive the tongue;

the locking means comprise an L-shaped slot that is provided in the spine member, that has its long branch extending longitudinally and opening out at the front longitudinal end of the spine member, and that has its short branch extending transversely, and the locking means further comprise a slide that is mounted to move transversely inside the hollow body;

the means for fastening to the wiper blade comprise two facing longitudinal hooks which extend vertically downwards from a bottom horizontal wall of the hollow body, and the bottom end of each hook extends transversely towards the other hook while clamping a vertical interconnection web of the wiper blade;

the free inner end of each hook is provided with claws that extend transversely towards the inside of the hook and that are engaged in the interconnection web of the wiper blade;

the interconnection web of the wiper blade and the hollow body are each provided with a respective transverse orifice situated in alignment with each other, and that receive a complementary transverse pin that locks the wiper blade so as to prevent it from moving longitudinally relative to the end-piece;

the tongue extends vertically downwards from a top edge of the hollow body, and the bottom end of the tongue carries the transverse pin;

the horizontal bottom wall of the hollow body has an elastically deformable portion whose bottom face carries claws that are engaged in a top back of the wiper blade; and the elastically deformable portion is suitable for elastically deforming inside the cylindrical recess while the wiper blade is being inserted between the bottom hooks, and then in deforming resiliently downwards in a manner such that the claws engage in the top back, while the spine member is being engaged in the cylindrical recess.

Other characteristics and advantages of the invention will appear on reading the following detailed description which, for the purposes of making it easier to understand, is given with reference to the accompanying figures, in which:

FIG. 1 is a diagrammatic perspective view of an end-piece of the invention, prior to being mounted on the spine member of the wiper blade unit;

FIGS. 2A to 2D are section views of the end-piece shown in FIG. 1, showing various positions of the moving element and of the locking tongue, for mounting or dismounting the spine member;

FIG. 3 is a view from below of the end-piece shown in FIG. 1;

FIGS. 4A to 4C are views similar to FIGS. 2A to 2C, showing a variant embodiment of the end-piece of the invention;

FIG. 5 is a diagrammatic perspective view with a cutaway showing a variant embodiment of the end-piece, in which the moving element makes it possible to lock the tongue;

FIGS. 6A to 6C are section views of the end-piece shown in FIG. 5, showing various positions of the moving element and of the locking tongue, for mounting or dismounting the spine member;

FIG. 7 is a perspective view from below of the moving element shown in FIG. 5;

FIG. 8 is a diagrammatic perspective view of another embodiment of the end-piece;

FIGS. 9A and 9B are section views of the end-piece shown in FIG. 8, showing various positions of the moving element and of the locking tongue, for mounting or dismounting the spine member;

FIG. 12 is a diagrammatic perspective view of another embodiment of the end-piece;

FIGS. 13A to 13C are section views of another embodiment of the end-piece, showing various positions of the moving element and of the locking tongue, for mounting or dismounting the spine member;

FIGS. 14A and 14B are section views of another embodiment of the end-piece, showing various positions of the moving element and of the locking tongue, for mounting or dismounting the spine member;

Figure 10:
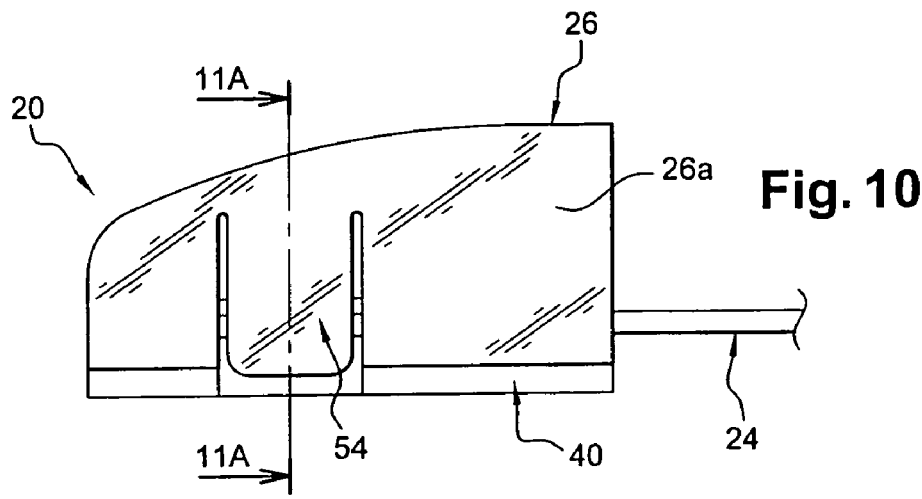
FIG. 10 is a side view of another embodiment of the end-piece, in which the moving element forms a tongue that is formed integrally with the hollow body of the end piece.

FIGS. 17A to 17D are section views of another embodiment of the end-piece, showing various positions of the moving element and of the locking tongue, for mounting or dismounting the wiper blade; and FIGS. 18A to 18C are longitudinal section views of another embodiment of the end-piece, showing various positions of the moving element and of the locking tongue, for mounting or dismounting the wiper blade.

For the description of the invention, the vertical, longitudinal, and transverse axes are adopted using the reference frame V, L, T indicated in the figures.

The front-to-back direction is also adopted as being the direction from left to right along the longitudinal axes as shown in FIG. 1.

In the following description, elements that are identical, similar, or analogous are designated by the same reference numerals.

FIG. 1 shows an end-piece 20 of a "flat-blade" type windshield wiper blade unit, which end-piece is designed to be mounted on the front longitudinal end of a support structure of the wiper blade unit.

In known manner, the support structure of the wiper blade unit comprises a longitudinal support frame 22 (shown in FIG. 18B) and a stiffener spine member 24 in the form of a longitudinal horizontal strip that is mounted inside the support frame 22.

When the end-piece 20 is mounted on the front longitudinal end of the support structure, it covers said front end of the support frame 22 and the front end of the spine member 24.

For this purpose, the end-piece comprises a hollow body 26 which is open backwards, and in the inside volume 28 of which the front end of the support frame 22 and the front end of the spine member 24 are received.

The hollow body 26 is also provided with a cylindrical recess 30 whose major axis is longitudinal and in which the front end of the spine member 24 is engaged.

The cross-section of the cylindrical recess 30 on a transverse vertical plane is complementary to the vertical cross-section of the spine member 24 so as to ensure that the front end of the spine member 24 is held vertically and transversely in the engaged position in which it is engaged in the cylindrical recess 30.

In a manner in widespread use in "flat-blade" type wiper blade units, the support frame 22 is shaped aerodynamically so that the relative wind generated while the vehicle is moving generates a force pressing the wiper blade unit against the glazing to be wiped.

Since the hollow body 26 is mounted around the support frame 22, said hollow body is also shaped aerodynamically. For this purpose said hollow body has a concave top wall 26s and a vertical longitudinal side wall 26a.

The end-piece 20 makes it possible to fasten the support frame to a wiper blade 32 for wiping a pane of glazing of the vehicle.

Figure 17A:
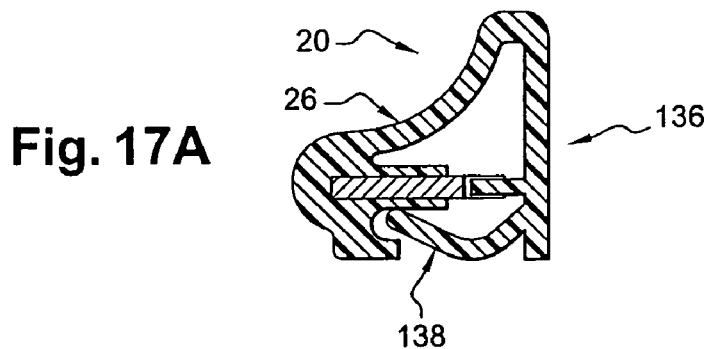
Figure 17B:
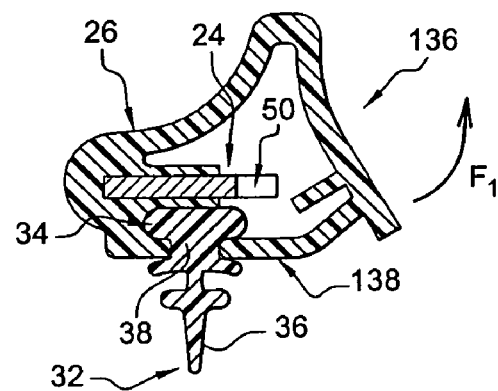
Figure 17C:
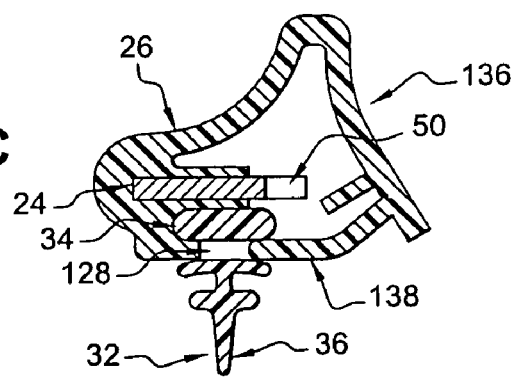
Figure 17D:
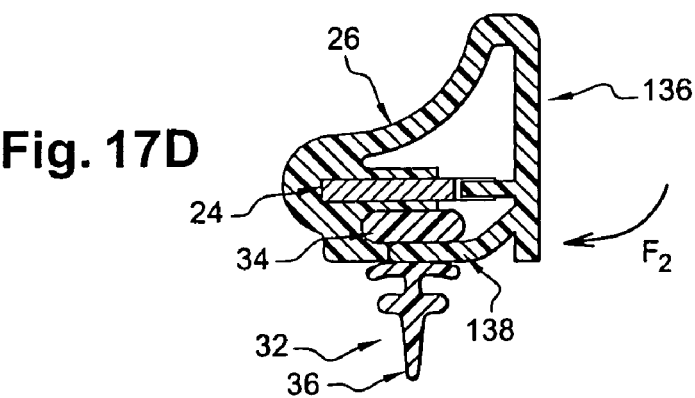

The wiper blade 32, which is shown in particular in FIGS. 17B to 17D, has a top back or heel 34, a bottom squeegee 36, and a vertical interconnection web 38 for connecting the top back 34 to the bottom squeegee 36.

For fastening it to the wiper blade 32, the end-piece 20 is provided with two bottom longitudinal hooks 40 that face each other and that extend vertically downwards from a bottom wall 42 of the hollow body 26, and thus the bottom end 40i of each longitudinal hook 40 is curved back inwards, in a manner such that it extends transversely towards the other longitudinal hook 40.

The longitudinal hooks 40 thus define a hollow recess 44 that is complementary to the top back 34 of the wiper blade 32, and which is downwardly open, for passing the vertical interconnection web 38.

The end-piece 20 fastens the wiper blade 32 to the support structure, i.e. to the spine member 24 and to the support frame 22.

For this purpose, the end-piece 20 is provided with locking means for locking the front end of the spine member 24 in the position in which said spine member is engaged in the cylindrical recess 30.

In a first embodiment, said locking means comprise a resilient tongue 46 whose free end is provided with a lug 48 that extends into the cylindrical recess 30 and that is received in a complementary notch 50 in the front end of the spine member 24.

The notch 50 is formed in a side edge 24a of the spine member 24, and it has a front face 50a against which the lug 48 presses so as to lock the spine member 24 such that it is prevented from moving longitudinally backwards.

In order to enable the wiper blade 32 to be dismounted from the support frame 22, the end-piece 20 can be dismounted from the spine member 24.

For this purpose, in accordance with the invention, the locking of the spine member 24 in the position in which it is engaged inside the cylindrical recess 30 is declutchable, i.e. the lug 48 of the resilient tongue 46 is suitable for no longer co-operating with the notch 50 in the spine member 24.

When the lug 48 no longer co-operates with the notch 50 in the spine member 24, i.e. when the lug 48 extends outside of the notch 50, the spine member 24 is free to move longitudinally backwards relative to the end-piece 20.

In a first embodiment of the invention, the tongue 46 extends horizontally along a substantially transverse axis inside the hollow body 26, and it extends above the cylindrical recess 30.

Thus, the tongue 46 is formed in a horizontal inside wall 52 of the hollow body 26 that defines the cylindrical recess 30 in part, and the lug 48 extends vertically downwards from a bottom face of the tongue 46.

In addition, the tongue 46 is mounted to move inside the hollow body 26 between a locking low position shown in FIGS. 2A and 2B, in which the lug 48 is suitable for being received in the notch 50, and an unlocking raised position shown in FIGS. 2C and 2D, in which the lug 48 extends outside the notch 50.

Since the tongue 46 is formed in the horizontal inside wall 52 of the hollow body 26, its stable position is its low position shown in FIG. 2A. Thus, when the tongue 46 is in its raised position, it is therefore elastically deformed, and it is resiliently urged back towards its low position.

This resilient return of the tongue 46 towards its low position makes it possible to have a stable locking position for locking the spine member 24.

Thus, moving the tongue 46 towards its raised position requires additional action to be taken on the tongue 46, against the resilient return force urging it back into its low position.

In the first embodiment of the invention shown in FIGS. 2A to 4C, the tongue 46 is moved towards its raised position by means of an element 54 that is mounted to move relative to the hollow body 26, and that drives the tongue 46 towards its high position as it moves relative to the hollow body 26.

Said moving element 54 is mounted to slide inside a bottom recess 56, and it comprises a longitudinal body 58 and a top abutment finger or control finger 60 that is suitable for co-operating with the lug 48 for driving the tongue 46 towards its high position.

The bottom recess 56 extends below the cylindrical recess 30, and it is open at its front longitudinal end, so as to enable the moving element 54 to be inserted into it.

In order to drive the tongue 46 towards its high position, the moving element 54 is provided with guide means (62) suitable for co-operating with complementary means (64) in the recess (56). The element (54) is thus suitable for being moved upwards while it is sliding inside the bottom recess 56, so that, simultaneously, the top finger 60 pushes the lug 48 upwards, out of the notch 50.

To this end, the moving element 54 is further provided with sloping faces 62 which are suitable for co-operating with complementary ramp-shaped portions 64 in the bottom recess 56.

Thus as can be seen successively in FIGS. 2B and 2C, the moving element 54 is firstly inserted into the bottom recess 56, until the sloping faces 62 come into contact with the ramp-shaped portions 64. During this first movement, the moving element 54 moves longitudinally backwards inside the bottom recess 56.

In a second movement, as can be seen in FIG. 2C, the moving element 54 continues to move backwards (rightwards in the figures), and the co-operation between the sloping faces 62 and the ramp-shaped portions 64 forces the moving element 54 to move in translation in a slanting direction backwards and upwards.

During this backward and upward movement, the top finger 60 of the moving element 54 pushes the lug 48 upwards, out of the notch 50, while taking its place inside the notch 50.

The spine member 24 is then no longer locked by the lug 48, and it can thus slide backwards inside the cylindrical recess 30.

Since the top finger 60 is received in the notch 50 in the spine member 24 when the moving element 54 is in its rear position shown in FIG. 2C, said moving element potentially locks the spine member 24 inside the cylindrical recess 30.

In order to enable the spine member 24 to be dismounted, the top finger 60 is provided with a bevel 66 that is shaped to enable the moving element 54 to move forwards and downwards inside the bottom recess 56, at the same time as the spine member 24 is being moved backwards.

In a variant embodiment shown in FIGS. 4A to 4C, the bottom recess 56 also opens out upwardly, into the cylindrical recess 30, and backwards into the internal volume 28 of the hollow body 26.

This enables the moving element 54 to come out of the bottom recess 56 longitudinally backwards, simultaneously with the movement of the spine member 24.

In addition, since the abutment finger 60 is received in the notch 50 when the moving element 54 is in the high position in which it has driven the tongue 46 towards its high position, the spine member 24 is suitable for driving the moving element 54 on being disengaged from the cylindrical recess 30.

FIGS. 8, 9A, and 9B show another embodiment of the moving element 54, in which the side wall 26a of the hollow body 26 is provided with an opening or window 68 which gives access to the free end of the tongue 46, and in which the moving element 54 forms a flap which is mounted to move relative to the hollow body 26 between a closed position shown in FIG. 9a, in which the moving element 54 closes off the opening 68, and an open position shown in FIG. 8, in which the opening 68 is uncovered.

When the moving element 54 is in this open position in which the opening 68 is uncovered, as shown in FIG. 8, it is then possible to access the tongue and to act on the free end of the tongue 46 so as to move it towards its high position.

In a variant of this other embodiment of the invention, the moving element 54 further serves as a tool that is used manually by a person to drive the tongue 46 towards its high position.

To this end, as can be seen in FIG. 9B, the moving element 54 is used in the manner of a lever, and a bottom edge 54i of the moving element 54 is provided with a bevel 70 making it possible to facilitate inserting the bottom edge 54i below the lug 48.

Finally, the top edge 54s of the moving element 54 is also provided with a bevel 72, which makes it possible to facilitate disuniting the moving element from the hollow body 26 when the moving element 54 is in its closed position.

The moving element 54 is held in the closed position by means of interfitting complementary shapes. For this purpose, as can be seen in FIGS. 9A and 9B, the moving element 54 is provided with top and bottom hooks 76 which are suitable for co-operating with the wall 26a of the hollow body 26 for holding the moving element 54.

In another variant, the moving element 54 locks the tongue 46 in the locking position when it is in its closed position shown in FIG. 9A.

For this purpose, the moving element 54 is provided with an internal finger 74 which presses on the top face 46s of the tongue 46 when it is in the closed position.

Figure 11A:
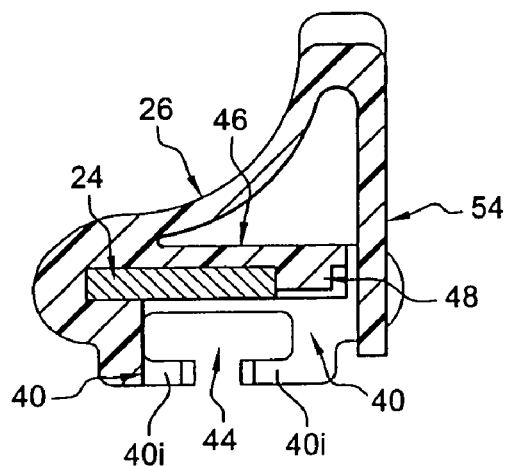
FIGS. 11A and 11B are section views of the end-piece shown in FIG. 10, showing various positions of the moving element and of the locking tongue, for mounting or dismounting the spine member.
Figure 11B:
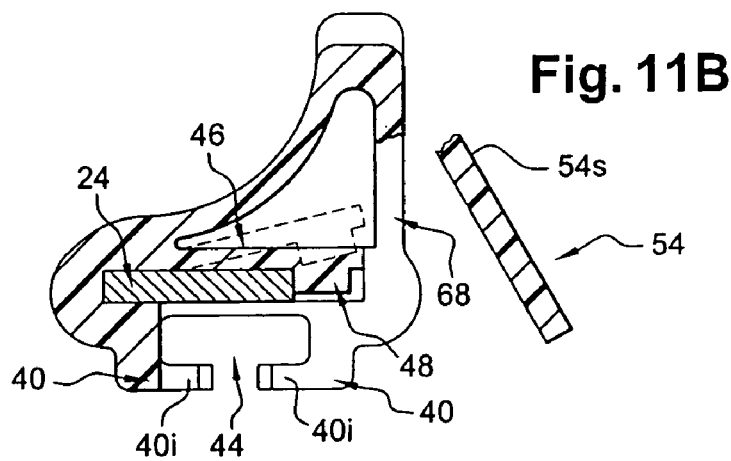

FIGS. 10, 11A, and 11B show another embodiment of the moving element 54 which consists in a vertical tongue, which is formed integrally with the hollow body 26, and which is formed in the side wall 26a of the hollow body 26.

The moving element 54 is suitable for being disunited from the hollow body 26 by its top end 54s being broken, as shown in FIG. 11B, in a manner such as to uncover the opening 68.

It is then possible to drive the tongue 46 towards its high position, manually or by means of a tool, through the opening 68 uncovered in this way.

FIGS. 14A and 14B show a variant embodiment of the moving element 54 which also consists in a vertical tongue which is formed in the side wall 26a of the hollow body 26.

For driving the tongue 46 towards its high position, the moving element 54 is elastically deformable towards the inside of the hollow body 26, and its bottom end 46i is provided with an internal abutment or control finger 74 that acts on the free end of the tongue 46 for driving it towards its high position.

FIG. 12 also shows another embodiment of the moving element 54, which is mounted to move between a closed position in which it closes off the opening 68 and an open position in which the opening 68 is uncovered.

In this example, the moving element 54 is suitable for entirely covering the side wall 26a of the hollow body 26 when it is in its closed position.

The moving element 54 is held in the closed position by means of a bottom rib 76 and by means of a top rib 78, which ribs extend transversely respectively from the bottom edge and from the top edge of the side wall 26a, and each of the ribs is provided respectively with a bottom groove 80 or with a top groove 82.

The bottom groove 80 and the top groove 82 position the moving element 54 relative to the side wall 26a of the hollow body 26, and the moving element 54 is held in its closed position by means of a finger 84 that is formed in the top groove 82 and that is suitable for being received in a complementary notch 86 of the moving element 54.

FIGS. 13A to 13C show another embodiment of the tongue 46 which is formed in the side wall 26a of the hollow body 26, and which extends substantially longitudinally, backwards towards a front edge of the side wall 26a.

In this embodiment, the tongue 46 is also provided with a lug 48 which is received in the notch 50 in the spine member 24 for longitudinally locking the spine member 24 in the position in which it is engaged in the cylindrical recess 30.

In this embodiment, the tongue 46 is also elastically deformable, and it is thus mounted to move between a locking first position (shown in FIG. 13A) in which it extends longitudinally, and in which the lug 48 is received in the notch 50, and an unlocking position (shown in FIG. 13C) in which the tongue 46 is elastically deformed towards the outside of the hollow body 26 in a manner such that the lug 48 extends outside the notch 50.

The side wall 26a is provided with an opening 68 which is situated behind the tongue 46 and through which it is possible to insert a tool 88 making it possible to drive the free rear end of the tongue 46 so as to drive it towards its unlocking position.

Finally the side wall 26a is provided with a moving element 54 that closes off said opening 68.

The moving element 54 is formed integrally with the side wall 26a, and it extends longitudinally forwards from a rear side edge 68a of the opening 68.

The rear longitudinal edge of the moving element 54 has a portion 90 of low breaking strength that is suitable for being broken in order to uncover the opening 68, thereby making it possible to drive the tongue 46 towards its unlocking position.

In a preferred embodiment, the opening 68 is situated longitudinally in register with the notch 50 in the spine member 24, so that the moving element 54 is mounted to move into the notch 50 in order to uncover the opening 68.

In addition, since the opening 68 is situated in register with the notch 50, it is easier to insert the tool 88 into the hollow body 26 in order to drive the tongue 46.

FIGS. 5 to 7 show another embodiment 10 of the moving element 54 which is mounted to slide inside a longitudinal recess 56 formed in the hollow body 26, and which is suitable for taking up, inside said longitudinal recess 56, a locking position for locking the tongue 46 in the locking position, and a position in which the tongue 46 is suitable for moving towards its high position.

The tongue 46 is moved towards its high position when the spine member 24 is pulled backwards out of the cylindrical recess 30. For this purpose, the lug 48 has a ramp-shaped portion 48a that co-operates with the front face 50a of the notch 50.

The moving element 54 is also suitable for taking up a mounting initial position shown in FIG. 6A, making it possible for the tongue 46 to move towards its high position on engaging the spine member 24 into the cylindrical recess 30.

Thus, the moving element 54 is suitable for taking up three distinct and consecutive positions inside the longitudinal recess 56, the positions respectively corresponding to the spine member 24 being mounted into, locked inside, and dismounted from the cylindrical recess 30, as can be seen successively in FIGS. 6A, 6B, and 6C.

When the moving element 54 is in its mounting first position shown in FIG. 6A, it makes it possible for the tongue 46 to move towards its high position. For this purpose, it is arranged longitudinally in front of the tongue 46, so as not to hinder movement of the tongue 46.

When the spine member 24 is in the position in which it is engaged in the cylindrical recess 30, the moving element 54 is then moved longitudinally backwards towards its second position shown in FIG. 6B, and in which it covers the tongue 46. In this position, the moving element 54 locks the tongue 46 in the locking position.

In order to enable the spine member 24 to be dismounted from the cylindrical recess 30, the moving element 54 is moved longitudinally backwards from its second position towards its third position shown in FIG. 6C.

For this purpose, the moving element 54 is provided with a bottom groove 100 in its bottom horizontal face 98. The bottom groove 100 is arranged longitudinally in the bottom face 98 of the moving element 54 in a manner such that, when the moving element 54 is in its third position, the bottom groove 100 extends above the tongue 46.

Thus, the tongue 46 is suitable for being moved upwards, into the bottom groove 100.

Finally, the moving element 54 and the longitudinal recess 56 are provided with locking or retaining means for locking or retaining the moving element 54 in each of the three distinct positions.

In this embodiment, the longitudinal recess 56 is provided with a front spike or point 92 and a with a rear spike or point 94 that project in relief upwards from its bottom horizontal wall 56i, and that are arranged longitudinally in front of and behind the tongue 46.

The front spike 92 and the rear spike 94 are selectively received in a complementary transverse groove 96 that is formed in the bottom face 98 of the moving element 54, as a function of the longitudinal position of the moving element 54.

Thus, as can be seen in FIG. 6A, when the moving element 54 is in its mounting first position, the front spike 92 is received in the transverse groove 96, thereby locking or retaining the moving element 54.

When the moving element 54 is in its locking second position shown in FIG. 6B, the rear spike 94 is received in the transverse groove 96, thereby locking the moving element in its second position.

Finally, when the moving element 54 is in its dismounting third position shown in FIG. 6C, the front spike 92 and the rear spike 94 are in abutment respectively against the front and against the rear transverse faces of the bottom groove 100, thereby locking the moving element 54 in its third position.

Finally, the longitudinal recess 56 is provided with an abutment-forming element 102 forming a rear abutment for the moving element 54 when it is in its dismounting third position shown in FIG. 6C.

In this embodiment, the abutment element 102 is substantially lying-down L-shaped, the long branch 104 of the L-shape extending longitudinally and upwards from the bottom horizontal face 56i of the longitudinal recess 56, and its short branch 106 extending vertically upwards from the rear longitudinal end of the long branch 104.

When the moving element 54 is in its dismounting third position, the abutment-forming element 102 is received inside a complementary groove 108 in the moving element 54.

Figure 15:
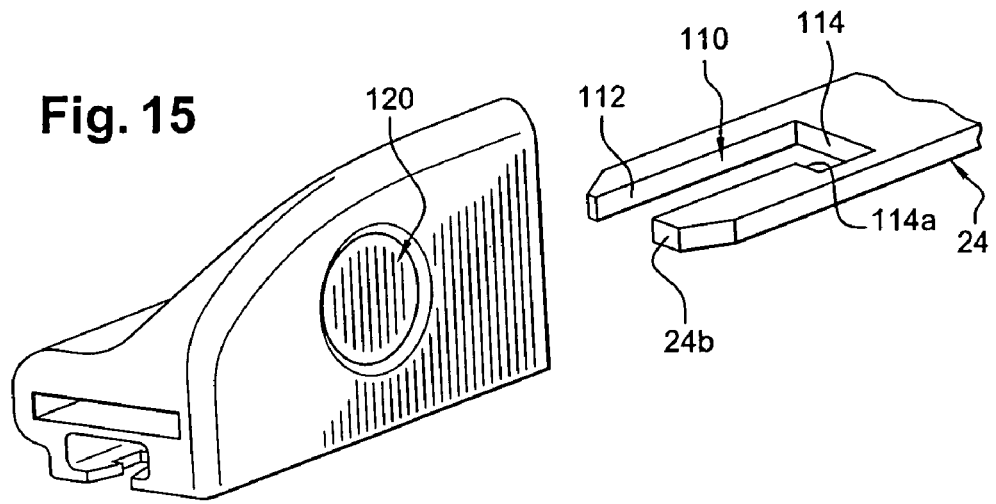
FIG. 15 is a diagrammatic perspective view of another embodiment of the end-piece, in which the spine member has an L-shaped groove.
Figure 16A:
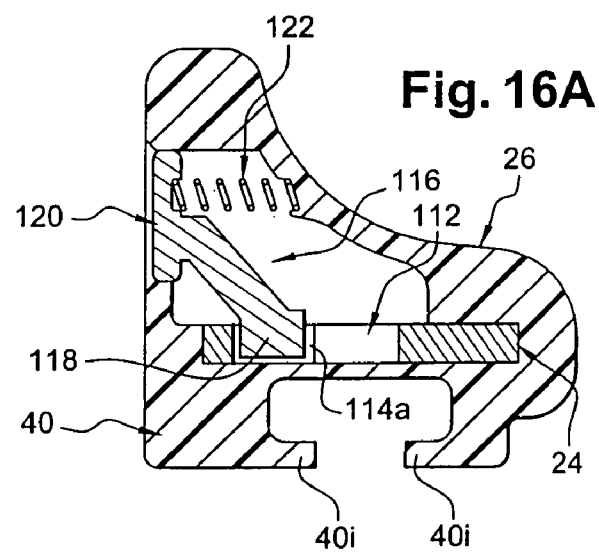
FIGS. 16A and 16B are section views of the end-piece shown in FIG. 15, showing various positions of the moving element and of the locking tongue, for mounting or dismounting the spine member.
Figure 16B:
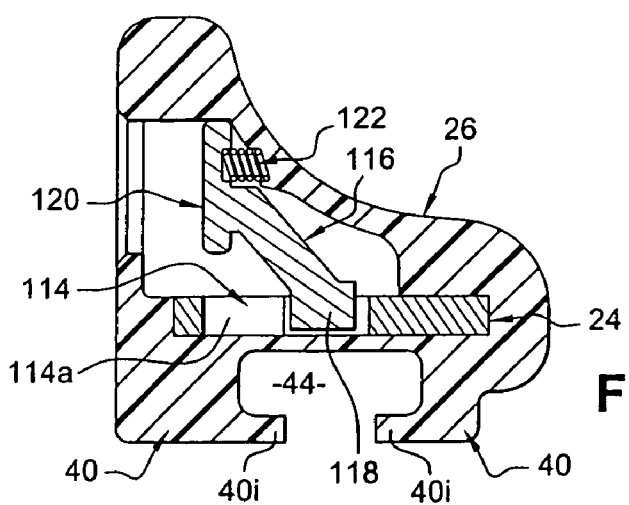

FIGS. 15, 16A, and 16B show another embodiment of the locking means for locking the spine member 24 in the engaged position in which it is engaged in the cylindrical recess 30, in which embodiment the spine member 24 is provided with a central slot 110 that extends longitudinally backwards from the vertical transverse face 24b of the front longitudinal end of the spine member 24.

The central slot 110 is substantially L-shaped, the long branch 112 of the L-shape extending longitudinally rearwards from the vertical transverse face 24b of the spine member 24, and opening out into said vertical transverse face 24b of the spine member 24.

The short branch 114 of the central slot 110 extends the rear longitudinal end of the long branch 112 transversely.

In order to lock the spine member 24 in the engaged position in the cylindrical recess, the end-piece 20 is provided with a slide 116 that is provided with a bottom finger 118 that is received in the L-shaped slot, and with a side button 120 via which a user can drive the slide 116.

When the spine member 24 is in the engaged position in which it is engaged in the cylindrical recess 30, the bottom finger 118 of the slide 116 is received inside the short branch 114 of the central slot 110.

Finally, the slide 116 is mounted to move inside the hollow body 26 between a locking first position shown in FIG. 16A and in which the bottom finger 118 is received in the free end of the short branch 114, so that it is situated in register with the front transverse face 114a of the short branch 114, and a second position shown in FIG. 16B and in which the bottom finger 118 extends in register with the long branch 112.

Thus, when the slide 116 is in its first position, the bottom finger 118 constitutes a longitudinally rearward abutment for the spine member 24, thereby preventing it from being dismounted, and, when the slide 116 is in its second position, the spine member 24 is free to disengage from the cylindrical recess 30, the long branch 112 of the slot 110 being guided by the bottom finger 118.

In the embodiment shown in FIGS. 16A and 16B, the cursor 116 is mounted to slide transversely inside the hollow body 26, and the end-piece 20 is provided with a resilient return element 112 for resiliently urging the slide 116 back towards its locking first position. In this embodiment, the resilient return element 122 consists of a compression spring.

In a variant embodiment, the slide 116 is formed integrally with the end-piece 20, and the side button 120 is connected to the side wall 26a of the hollow body 26 via at least one interconnection strip 121 (as shown in FIG. 15) which connects a top edge of the side button 120 to the side wall 26a.

However, it is understood that the invention is not limited to this embodiment, and that the interconnection strip 121 can be arranged differently.

The strip of material 121 guides the slide 116 in a pivotal movement inside the body 26, and it also provides resilient return for the slide 116 (instead of or in addition to the spring 122) for returning it to a stable position for locking the spine member 24 in the engaged position in which it is engaged in the hollow recess 20, the bottom finger 118 being received in the short branch 114 of the slot in said stable position.

In order to fasten the wiper blade 32 to the support frame 22, the end-piece 20 is also provided with means for fastening it to the wiper blade 32.

FIG. 3 shows a first embodiment of the means for fastening the end-piece 20 to the wiper blade 30, which means comprise claws 124 which extend the bottom ends 40i of the hooks 40 transversely inwards, and which are suitable for engaging in the interconnection web 38 of the wiper blade 32.

FIGS. 8, 9A, and 9B show another embodiment of the fastening means for fastening the end-piece 20 to the wiper blade 32. In this embodiment, each of the bottom hooks 40 is provided with a transverse orifice 126, and the top back 34 of the wiper blade 32 is also provided with a transverse orifice 128.

When the wiper blade 32 is in the mounted position, the transverse orifices 126 of the hooks 40 and the transverse orifice 128 of the top back 34 of the wiper blade 32 extend in alignment with one another.

Finally, said transverse orifices 126, 128 receive a transverse pin 130 of complementary section.

In a preferred embodiment, the transverse pin 130 is crimped into the transverse orifices 126 of the bottom hooks 40, thereby preventing it from being dismounted in untimely manner from the end-piece 20.

FIGS. 18a to 18C show another embodiment of the means for fastening the end-piece 20 to the wiper blade 32. In this embodiment, the horizontal bottom wall 42 of the hollow body 26 is provided with an elastically deformable portion 132, the horizontal bottom face 132i of which is provided with bottom claws 134 that extend inside the hollow recess 44 in which the top back 34 of the wiper blade 32 is received.

This elastically deformable portion 132 is shaped so that when the top back 34 of the wiper blade 32 is inserted into the hollow recess 44, it deforms elastically upwards into the cylindrical recess 30, as can be seen in FIG. 18B. Thus, the bottom claws 134 retract upwards in order to allow the top back 34 to go past freely.

Then, on inserting the spine member 24 into the cylindrical recess 30, as can be seen in FIG. 18C, the spine member 24 exerts a downwards press force on the top horizontal face 132s of the elastically deformable portion 132, thereby deforming the elastically deformable portion 132 downwards again, so that the bottom claws 134 penetrate into the top back 34 of the wiper blade 32.

The bottom claws 134 are shaped so as to lock the wiper blade 32 such as to prevent it from moving longitudinally relative to the end-piece 20.

FIGS. 17A to 17D show yet another embodiment of the means for locking the wiper blade 32 such that it is prevented from moving longitudinally relative to the end-piece 20. In this embodiment, the side wall 26a of the hollow body 26 is provided with a tongue 136 that extends vertically downwards from the top edge of the side wall 26a, that is, for example, formed by being cut out from the side wall 26a, and that is provided with a transverse finger 138 which is suitable for being received in a transverse orifice 128 provided in the interconnection web 38 of the wiper blade 32.

FIGS. 17B to 17D show the various steps of mounting the wiper blade 32 onto the end-piece 20.

In a first movement, shown in FIG. 17B, the tongue 136 is deformed elastically towards the outside of the hollow body 26 of the end-piece 20, as indicated diagrammatically by arrow F1, in a manner such as to uncover the hollow recess 44.

Then, the wiper blade 32 is mounted on the end-piece 20, by inserting its top back 34 into the hollow recess 44 by applying a longitudinal forward or backward movement, until the transverse orifice 128 is situated longitudinally in register with the transverse finger 138, as shown in FIG. 17C.

Finally, as shown in FIG. 17D, the tongue 136 is released, said tongue then returning resiliently to its initial position in which it extends vertically, as indicted by arrow F2, thereby causing the transverse finger 138 to engage in the transverse orifice 128, thereby longitudinally locking the wiper blade 32 relative to the end-piece 20.

The invention claimed is:

1. An end-piece for a windshield wiper blade unit that comprises at least one spine member and a wiper blade, wherein the end-piece comprises:
    an open hollow body that receives a longitudinal end of the spine member;
    locking means disposed within the open hollow body which locks for locking the end of the spine member in an engaged position in the hollow body,
        wherein the locking means is declutchable, so as to enable the end-piece to be dismounted from the end of the spine member; and
    a moving element formed in a side wall of the open hollow body and that is distinct from the locking means,
        wherein the moving element is provided with complementary means that are complementary to the locking means and that serve to co-operate with said locking means to unlock the spine member, and
        wherein the locking means is disengaged from the spine member when the complementary means of the moving element contacts and drives the locking means.

2. An end-piece according to claim 1, wherein the locking means comprise a tongue having a free end provided with a lug that is received in a complementary notch provided in the spine member, so as to lock the end of the spine member such that the spine member is prevented from moving longitudinally in the engaged position in which the spine member is engaged in the cylindrical recess.

3. An end-piece according to the preceding claim, wherein the tongue is resilient.

4. An end-piece according to claim 1, wherein said moving element is formed integrally with the hollow body.

5. An end-piece according to claim 4, wherein the moving element is united or integral with the hollow body.

6. An end-piece according to claim 4, wherein moving element is suitable for being elastically deformed so as to drive the tongue towards its unlocking position.

7. An end-piece for a windshield wiper blade unit that comprises at least one spine member and a wiper blade, wherein the end-piece comprises:
    an open hollow body that receives a longitudinal end of the spine member;

locking means which locks the end of the spine member in an engaged position in the hollow body,
   wherein the locking means is declutchable, so as to enable the end-piece to be dismounted from the end of the spine member; and a moving element formed in a side wall of the open hollow body and that is distinct from the locking means,
   wherein the moving element is provided with complementary means that are complementary to the locking means and that serve to co-operate with said locking means to unlock the spine member, and
   wherein the locking means is disengaged from the spine member when the complementary means of the moving element contacts and drives the locking means.

8. An end-piece for a windshield wiper blade unit that comprises at least one spine member and a wiper blade, wherein the end-piece comprises:

an open hollow body that receives a longitudinal end of the spine member;

locking means which locks the end of the spine member in an engaged position in the hollow body,
   wherein the locking means is declutchable, so as to enable the end-piece to be dismounted from the end of the spine member; and a moving element that is distinct from the locking means,
   wherein the moving element is provided with complementary means that are complementary to the locking means and that serve to co-operate with said locking means to unlock the spine member, and
   wherein the locking means is disengaged from the spine member when the complementary means of the moving element contacts and drives the locking means.

\* \* \* \* \*